(12) United States Patent
Lyu

(10) Patent No.: US 11,293,854 B2
(45) Date of Patent: Apr. 5, 2022

(54) MEASUREMENT METHOD FOR SPECIFIC SURFACE AREA OF CONDUCTIVE MATERIAL

(71) Applicant: LG CHEM, LTD., Seoul (KR)

(72) Inventor: Byunggook Lyu, Daejeon (KR)

(73) Assignee: LG CHEM, LTD., Seoul (KR)

( * ) Notice: Subject to any disclaimer, the term of this patent is extended or adjusted under 35 U.S.C. 154(b) by 35 days.

(21) Appl. No.: 16/636,590

(22) PCT Filed: Jul. 4, 2019

(86) PCT No.: PCT/KR2019/008190
§ 371 (c)(1),
(2) Date: Feb. 4, 2020

(87) PCT Pub. No.: WO2020/009491
PCT Pub. Date: Jan. 9, 2020

(65) Prior Publication Data
US 2021/0164887 A1  Jun. 3, 2021

(30) Foreign Application Priority Data

Jul. 6, 2018 (KR) .................. 10-2018-0078977
Jul. 3, 2019 (KR) .................. 10-2019-0080218

(51) Int. Cl.
*G01N 17/02* (2006.01)
*G01N 27/22* (2006.01)

(52) U.S. Cl.
CPC ........... *G01N 17/02* (2013.01); *G01N 27/227* (2013.01)

(58) Field of Classification Search
CPC ............................. G01N 17/02; G01N 27/227
See application file for complete search history.

(56) References Cited

U.S. PATENT DOCUMENTS

| 6,118,573 | A | 9/2000 | Kubo et al. |
| 7,088,115 | B1 | 8/2006 | Glenn et al. |
| 2007/0109722 | A1 | 5/2007 | Ohmori |
| 2009/0272945 | A1 | 11/2009 | Kume et al. |
| 2012/0200304 | A1* | 8/2012 | Saha ............... G01B 7/105 324/649 |
| 2015/0318575 | A1* | 11/2015 | Choi ............... H01M 10/052 429/156 |

FOREIGN PATENT DOCUMENTS

| CN | 101283420 A | 10/2008 |
| CN | 107677712 A | 2/2018 |
| CN | 108051479 A | 5/2018 |
| JP | 10-239716 A | 9/1998 |

(Continued)

OTHER PUBLICATIONS

Lee et al., "A Facile and Template-Free Hydrothermal Synthesis of Mn3O4 nanorods on Graphene sheets for supercapacitor electrodes with long cycle stability" (2012) (Year: 2012).*

(Continued)

*Primary Examiner* — Tung X Nguyen
*Assistant Examiner* — Feba Pothen
(74) *Attorney, Agent, or Firm* — Dentons US LLP

(57) ABSTRACT

The present invention relates to a method and a system to measure the specific surface area of a conductive material through electrochemical impedance spectroscopy.

10 Claims, 3 Drawing Sheets

(56) References Cited

FOREIGN PATENT DOCUMENTS

| | | | |
|---|---|---|---|
| JP | 2002-151366 A | 5/2002 | |
| JP | 2002-184458 A | 6/2002 | |
| JP | 2002-260634 A | 9/2002 | |
| JP | 2002-296208 A | 10/2002 | |
| JP | 2005-310836 A | 11/2005 | |
| JP | 2006-133221 A | 5/2006 | |
| JP | 2007-043015 A | 2/2007 | |
| JP | 4827190 B2 | 11/2011 | |
| JP | 2012-023196 A | 2/2012 | |
| JP | 2015-49175 A | 3/2015 | |
| JP | 2018-92978 A | 6/2018 | |
| KR | 1998-046886 A | 9/1998 | |
| KR | 10-2011-0098067 A | 9/2011 | |
| KR | 10-2012-0107632 A | 10/2012 | |
| KR | 10-2017-0009472 A | 1/2017 | |
| WO | 2007/043515 A1 | 4/2007 | |

OTHER PUBLICATIONS

Suda et al., "Influences of internal resistance and specific surface area of electrode materials on characteristics of electric double layer capacitors" (Year: 2017).*
Endo et al., "High Power Electric Double Layer Capacitor (EDLC's); from Operating Principle to Pore Size Control in Advanced Activated Carbons" (Year: 2001).*
Tremblay et al., "Determination of the real surface area of powdered materials in cavity microelectrodes by electrochemical impedance spectroscopy", Electrochimica Acta, vol. 55, No. 21, Aug. 30, 2010, pp. 6283-6291.
Wang.(2016).Effect of Different Conductive Additives on the Electrochemical Properties of Mesoporous MnO2 Nanotubes.Int. J. Electrochem. Sci. vol. 11, pp. 6808-6818.
Zhou. (2015).High Performance All-solid Supercapacitors Based on the Network of Ultralong Manganese dioxide/Polyaniline Coaxial Nanowires.Scientific Reports. vol. 5,17858.
Roberts. (2010).Effect of specific surface area on capacitance in asymmetric carbon/-MnO2 supercapacitors.Electrochimica Acta 55. pp. 7460-7469.
Tremblay.2010.Determination of the real surface area of powdered materials in cavity microelectrodes by electrochemical impedance pectroscopy.Electrochimica Acta 55. pp. 6283-6291.
"Research on Preparation and Electrochemical Performances of Graphene based Composite Materials for Supercapacitor", Chinese Doctoral Dissertations & Master'sTheses Full-text Database (Doctor) Engineering Science and Technology II, No. 12 (2013), published on Nov. 16, 2013 to Dec. 15, 2013.
Dai Kai, "Electrochemical and Desalinating Performance of Electrodes Based on Carbon Nanotubes", Shanghai University Doctoral Dissertation (2007).
Su Guojun Liu Enhui et al., "Comprehensive Chemistry Experiment", Xiangtan University Press, Sep. 2008.
Wu Qisheng, et al., "New Energy Materials" (2015).
Reid et al., "Determining electrochemically active surface area in PEM fuel cell electrodes with electrochemical mpedance spectroscopy and its application to catalyst durability", Electrochimica Acta 114(2013) 278-284.

* cited by examiner

【Figure 1】
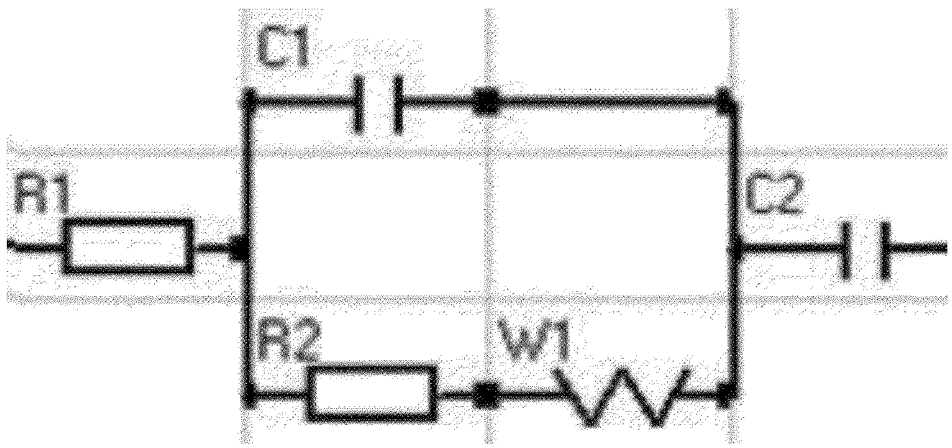
【Figure 2】
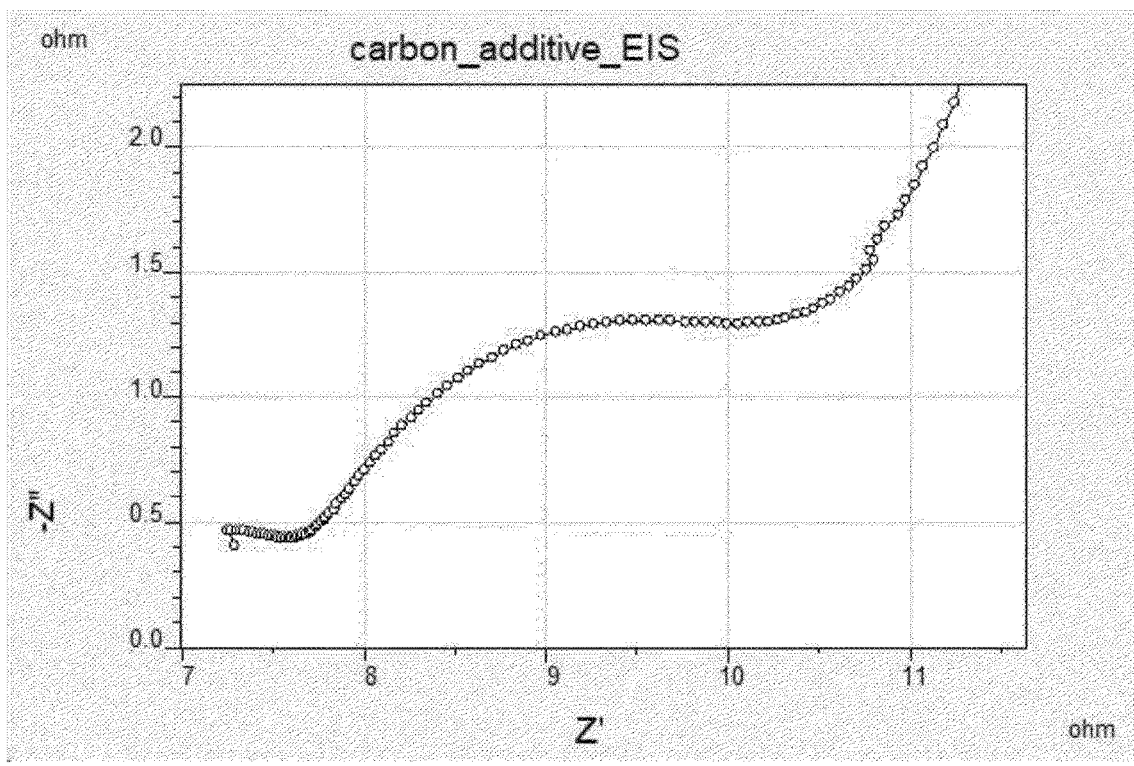

【Figure 3】
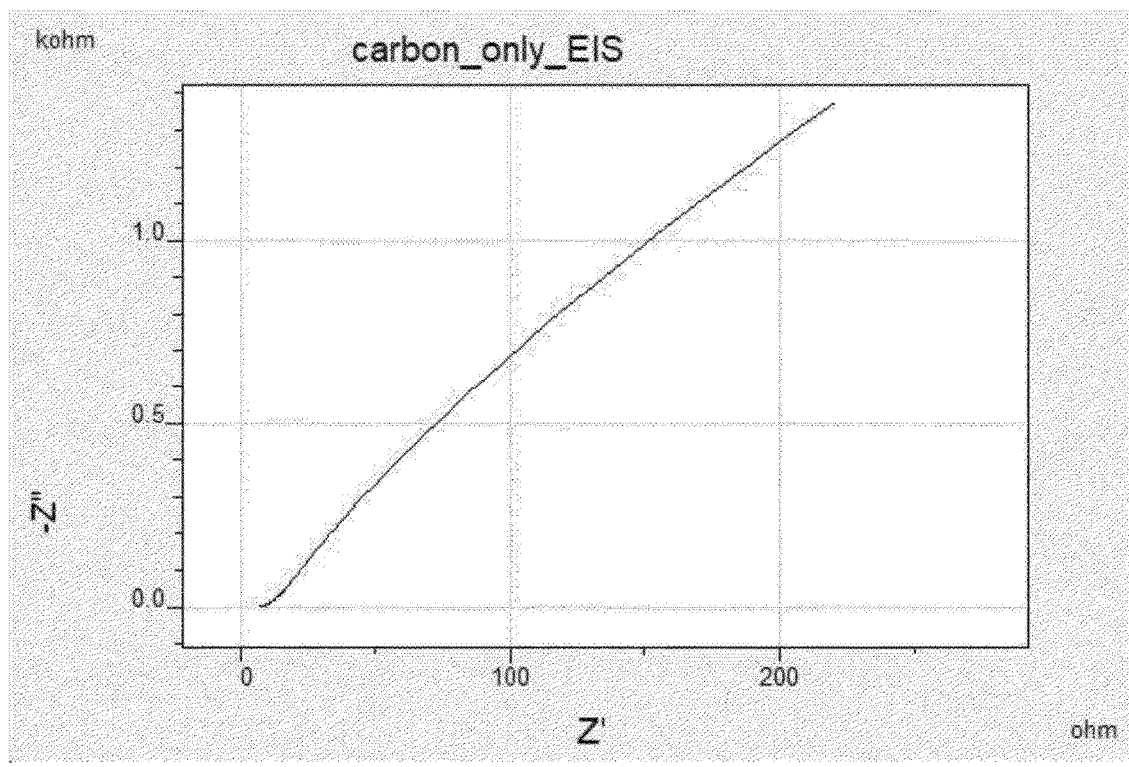

MEASUREMENT METHOD FOR SPECIFIC SURFACE AREA OF CONDUCTIVE MATERIAL

The present application is a National Phase entry pursuant to 35 U.S.C. § 371 of International Application No. PCT/KR2019/008190 filed on Jul. 4, 2019 and claims priority to and the benefit of Korean Patent Application No. 10-2018-0078977, filed on Jul. 6, 2018 and Korean Patent Application No. 10-2019-0080218, filed on Jul. 3, 2019, the entire disclosures of which are incorporated herein by reference in their entirety.

FIELD

The present invention relates to a method for measuring the specific surface area of a conductive material through electrochemical impedance spectroscopy.

BACKGROUND

In general, the typical method to measure the specific surface area of a material is to allow adsorption of an inert gas such as helium, nitrogen or the like, on to the material at a low temperature by a BET measuring device.

The BET measuring device used to measure the specific surface area is usually composed of a vacuum pump, a gas on-off switch, a computer for calculation, a heater, a liquid nitrogen tank and the like, and also necessarily requires high vacuum and high purity inert gas for adsorption when measuring the material. In addition, since the BET measuring device described above has a complicated structure, is heavy and large in size, and maintenance is required consistently. Also, since the BET measuring device analyzes the adsorption and desorption of a small amount of inert gas and calculates the specific surface area of the material, the measurement process is complicated and requires the use of a computer to control and regulate the device.

Meanwhile, another method to measure the specific surface area of a material is to measure the amount of nitrogen gas adsorbed while flowing high purity nitrogen gas at low temperatures, thus achieving the specific surface area of the material. However, this method requires another gas to transport the nitrogen gas, and also requires a special device capable of sensing the amount of nitrogen. Furthermore, since this method has difficulties calculating the amount of nitrogen gas adsorbed on the entire material, there exists a problem that measurement errors can be significant unless a large amount of material is used.

Particularly, despite the demand for measuring the specific surface area of a material composed of micropores, since measuring instruments are expensive and require more than seven hours to measure, some of the sample materials have to be prioritized then measured. Also, since the devices that measure specific surface area are expensive, there is also the case of experimentally manufacturing a BET measuring devices directly. However, since the BET measuring device is made of glass, and is connected to a vacuum pump to maintain the vacuum state, it is not easy to relocate the device, and also it will not actively respond to materials that requires quick measurements.

Patent Document

Korean Patent Publication No. 10-2017-0009472

SUMMARY

As described above, there exists problems, that the BET measuring device used to measure the specific surface area of a material is expensive, consumes a long time for measurement, and requires a large amount of the sample material.

Accordingly, in order to solve the above problems, an object of the present invention is to provide a method to measure the specific surface area of a conductive material by a simple method through electrochemical impedance spectroscopy.

In order to achieve the above objective, the present invention provides a method to measure the specific surface area of a conductive material, comprising the steps of:

(1) placing an additive, which forms a shunt resistance, onto the conductive material with an electric double layer;

(2) measuring the capacitance of the electric double layer of the conductive material through electrochemical impedance spectroscopy (EIS); and (3) calculating the specific surface area of the conductive material from the capacitance.

In addition, the present invention provides a system to measure the specific surface area of a conductive material comprising of:

(1) an addition module to place an additive, which forms a shunt resistance, onto the conductive material with an electric double layer;

(2) a measurement module to measure the capacitance of the electric double layer, of the conductive material through electrochemical impedance spectroscopy (EIS); and (3) a calculation module to calculate the specific surface area of the conductive material from the capacitance.

The method to measure the specific surface area of a conductive material of the present invention can measure the specific surface area of a conductive material by a simple method through electrochemical impedance spectroscopy.

In addition, the method to measure the specific surface area of the conductive material, of the present invention, requires only a small amount of sample material for measurement, and it can also be measured even in a wet environment.

BRIEF DESCRIPTION OF THE DRAWINGS

FIG. 1 is a circuit diagram of the electrochemical impedance of Example 1.

FIG. 2 is a graph showing the results of the electrochemical impedance of Example 1.

FIG. 3 is a graph showing the results of the electrochemical impedance of Comparative Example 1

DETAILED DESCRIPTION

Figure 4:
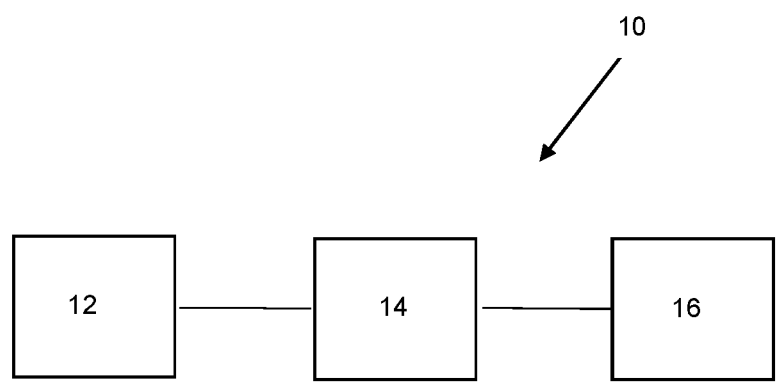
FIG. 4 is a schematic illustration of a system to measure the specific surface area of a conductive material.

Hereinafter, the present invention will be described in more detail.

In general, the specific surface area of a material is measured by a BET measuring device. However, there exists problems such that the BET measuring device is expensive, consumes more than several hours to measure the specific surface area, and requires a large amount of sample material. In addition, when the capacitance of the electric double layer by the electrode surface is predicted through the BET measurement, a large discrepancy can occur.

Meanwhile, electrochemical impedance spectroscopy (EIS) is a method to measure impedance by applying minute AC signals with different frequencies to the preferred cell. Various phenomena at the electrochemical interface occur differently depending on the frequency, causing changes in amplitude and phase, so that the capacitance, resistance and corrosion potential of the material can be measured, and the electrochemical behavior can be monitored therefrom.

The capacitance of a conductive material can be obtained by cyclic voltammetry (CV) or by a charging/discharging method, in addition to electrochemical impedance spectroscopy. However, the above methods are problematic in that noise is generated due to IR drop, gas generation or the like, so the error of the capacitance is large, and thus a large amount of sample is required for compensation. However, electrochemical impedance spectroscopy can minimize these problems.

Generally, a conductive material that does not react with an electrolyte will have an electric double layer (EDL) and the capacitance of the electric double layer of the conductive material is proportional to the specific surface area of the conductive material.

Therefore, the present invention is intended to provide a method to separately measure the capacitance of the electric double layer of a conductive material by electrochemical impedance spectroscopy, and then to measure the specific surface area of the conductive material therefrom. The method of the present invention can have an effect of using a small amount of sample and reducing the error significantly.

Therefore, the present invention relates to a method to measure the specific surface area of a conductive material, and more particularly, to a method to measure the specific surface area of a conductive material, comprising the steps of:

(1) placing an additive, which forms a shunt resistance, onto the conductive material with an electric double layer;

(2) measuring the capacitance of the electric double layer of the conductive material through electrochemical impedance spectroscopy (EIS); and (3) calculating the specific surface area of the conductive material from the capacitance. Step (1) is a step of placing an additive, which forms a shunt resistance, onto the conductive material with an electric double layer.

In the present invention, the conductive material is a material which does not react with the electrolyte. In general, the conductive material which does not react with the electrolyte will have an electric double layer, so that the conductive material of the present invention may be a material with an electric double layer.

In the present invention, the conductive material with the electric double layer, is not particularly limited as long as it is a conductive material with a resistance, and specifically examples thereof include porous carbon materials such as carbon nanotubes (CNT), graphite, carbon aerogels, polyacrylonitrile (PAN), carbon nanofiber (CNF), activated carbon nanofiber (ACNF), vapor grown carbon fiber (VGCF), and graphene.

The additive is a material that forms a shunt resistance of the conductive material with an electric double layer, thus reducing the resistance between the conductive material and the electrolyte.

Generally, it is difficult to measure the capacitance of the electric double layer of a conductive material with an electric double layer by electrochemical impedance spectroscopy. Accordingly, in order to measure the capacitance of the electric double layer of the conductive material, the present invention is to measure the capacitance of the electric double layer of the conductive material by electrochemical impedance spectroscopy through use of an additive.

The additive is not particularly limited as long as it is a substance capable of reversibly reacting with ions of an electrolyte, and specifically, examples thereof may comprise at least one selected from the group consisting of $LiMnO_2$, $MnO_2$, $LiMn_2O_4$, $LiFePO_4$, $Li(Ni_xCo_yMn_z)O_2$, $RuO_2$, $SnO_2$, $CoO$, $NiO$, $IrO_2$, $Mn_3O_4$, $CO_3O_4$, $NiCo_2O_4$, $V_2O_3$, $TiO_2$, $MoO_3$ and $Fe_2O_3$.

A reversible reaction refers to a reaction in which ions in the electrolyte and the additives undergo redox reaction or intercalation.

Therefore, the additive is a material capable of performing a redox reaction or an intercalation reaction with ions of an electrolyte, and for example, $MnO_2$ is a material capable of performing a redox reaction and $LiMn_2O_4$ is a material capable of performing an intercalation reaction.

The capacitance of the additive is significantly larger than the capacitance of the double layer of the conductive material, so that the reaction rate is relatively slow. Since the time scale in which the electric double layer of the conductive material is formed and the time scale in which the pseudocapacitance of the additive is formed are different, the pseudocapacitance of the additive does not affect the measurement of the conductive material double layer capacitance, but acts only as a shunt resistance at that time scale. In electrochemical impedance spectroscopy, in the case of the RC circuit, since the conductive material and the electrolyte do not react directly, the resistance is very large and the capacitance is very small, so that the capacitance cannot be detected easily because it is shielded by the Warburg element. However, in the present invention, it is possible to reduce the resistance by adding the above additive to the conductive material, thereby separating from the Warburg element and measuring the capacitance of the electric double layer of the conductive material.

More specifically, through electrochemical impedance spectroscopy, the signal is transmitted as a displacement current through a capacitor, while the electric signal and the electric double layer of the conductive material are repeatedly formed and dissipated. However, the formation rate of the electric double layer is too fast, and reacts only at high frequencies. At this time scale, in the high frequency band on the measurement system, the noise is large and the Warburg element is relatively large, so that the measurement cannot be done properly. If a shunt resistance is formed by adding the additive, the formation time of the electric double layer of the conductive material slows down, so that a semi-circle appears on a Nyquist plot and the capacitance of the electric double layer of the conductive material can be measured.

In addition, the amount of conductive material required to measure the specific surface area of the conductive material with an electric double layer by electrochemical impedance spectroscopy is 1 µg or more.

To measure the specific surface area of the material, a BET measuring device is usually used. The BET measuring device requires at least about 100 mg for measuring the specific surface area of the material. However, since the present invention requires only an amount of 1 µg or more for measuring the specific surface area of the conductive material with an electric double layer, the present invention has an advantage that the specific surface area of the conductive material with the electric double layer can be measured with a small amount of material.

In addition, the additive is contained in an amount of 1 to 20 parts by weight, preferably 5 to 15 parts by weight, based on the total weight of the conductive material with the electric double layer.

If the additive is contained in an amount of less than 1 part by weight, the reactivity of the additive decreases, diffusion of the electrolyte deteriorates, and the Warburg element may appear relatively strong. If the additive is contained in an amount exceeding 20 parts by weight, there is a problem that the amount of the additive is excessively high, which hinders the formation of a structure of a conductive material or the formation of an electric double layer, thereby making it difficult to measure the proper capacitance of the electric double layer of the conductive material.

In addition, since the additive usually has a density higher than that of the conductive material, even if it is contained in the above content range, the actual effect on the surface area is minimal, and the electric double layer formed on the additive disappears immediately and plays a role as a shunt. Therefore, since the electric double layer of the additive itself is weakly formed and minimized, it is possible to reduce the measurement error of the capacitance of the electric double layer of the conductive material.

Step (2) is a step of measuring the capacitance of the electric double layer of the conductive material through electrochemical impedance spectroscopy (EIS).

Since the electric double layer is formed in the conductive material through electrochemical impedance spectroscopy, and since the electric double layer surrounds the surface of the conductive material, the specific surface area of the conductive material can be measured from the capacitance of the electric double layer.

The electrochemical impedance spectroscopy can present the amplitude and phase of the impedance in a complex number plane, which is called the Nyquist plot. The Nyquist plot is represented by a straight line at an angle of 45° with a semicircle, where the diameter of the semicircle is the charge transfer resistance associated with the rate at which the electrical current travel through the interface between the electrolyte and the conductive material at the interface, and the straight line at 45° angle is the Warburg impedance (ZW), which indicates the mass transfer of charge carriers by diffusion.

Step (1) is a step of adding the additive to the conductive material with the electric double layer, and the additive makes the semicircle shielded by the Warburg element small and thus allows the capacitance of the electric double layer of the conductive material to be measured.

The measurement of the capacitance of the electric double layer, of the conductive material through electrochemical impedance spectroscopy can be performed by forming a three-electrode electrochemical cell comprising an electrolyte, while using the sample (the conductive material and the additive) prepared in step (1) as a working electrode, to measure the capacitance of the electric double layer of the conductive material.

The electrolyte is not particularly limited as long as it is used in a three-electrode electrochemical cell.

Therefore, the method of measuring the specific surface area of the conductive material of the present invention has an advantage that it can be measured even in a wet environment.

In addition, the capacitance measurement of the electric double layer of the conductive material through electrochemical impedance spectroscopy, has the advantage that the error is smaller than the BET method in measuring porous conductive materials.

Step (3) is a step of calculating the specific surface area of the conductive material from the capacitance of the electric double layer of the conductive material measured in step (2).

The capacitance of the electric double layer of the conductive material is proportional to the specific surface area, which can be calculated by Equation 1 or 2 below:

$$C = \frac{\varepsilon A}{4\pi d} \qquad \text{[Equation 1]}$$

wherein,
C: Capacitance of the electric double layer of the conductive material,
A: Specific surface area of the conductive material,
ε: Permittivity, and
d: Distance of the electric double layer of the conductive material, $$SSA = \frac{C}{C_0 m} \qquad \text{[Equation 2]}$$

wherein
SSA: Specific surface area per mass of the conductive material,
C: Capacitance of the electric double layer of the conductive material,
$C_0$: Capacitance relative to the specific surface area of the reference conductive material under the same measurement conditions, and
m: Mass of the conductive material.

Therefore, the specific surface area of the conductive material can be calculated through Equation 1 or 2.

$C_0$ in Equation 2 is a value measured as capacitance relative to the specific surface area of the conductive material under the same measurement conditions as the present invention, and serves as a reference.

As described above, in the present invention, after a sample is prepared with an additive capable of reducing the resistance between the conductive material and the electrolyte, the capacitance of the electric double layer of the conductive material can be calculated by electrochemical impedance spectroscopy, and the specific surface area of the conductive material can be obtained therefrom. That is, the present invention can measure the specific surface area of the conductive material by a simple method, and can have an effect of reducing the amount of sample required for measurement, and the measurement time.

In addition, the present invention also relates to a system to measure the specific surface area of the conductive material using the method of measuring the specific surface area of the conductive material as described above.

Specifically, the present invention relates to a system 10 (FIG. 4) to measure the specific surface area of the conductive material comprising of:

(1) an addition module 12 to place an additive, which forms a shunt resistance, onto a conductive material with an electric double layer;

(2) a measurement module 14 to measure the capacitance of the electric double layer of the conductive material through electrochemical impedance spectroscopy (EIS); and (3) a calculation module 16 to calculate the specific surface area of the conductive material from the capacitance.

The conductive material with the electric double layer in step (1) is the same as described above.

The additive is a material that forms a shunt resistance of a conductive material with an electric double layer, and reduces the resistance between the conductive material and the electrolyte.

The additive is not particularly limited as long as it is a substance capable of reversibly reacting with ions of an electrolyte, and specifically, examples thereof may include at least one selected from the group consisting of $LiMnO_2$, $MnO_2$, $LiMn_2O_4$, $LiFePO_4$, $Li(Ni_xCo_yMn_z)O_2$, $RuO_2$, $SnO_2$, $V_2O_3$, $CoO$, $NiO$, $IrO_2$, $Mn_3O_4$, $Co_3O_4$, $NiCo_2O_4$, $TiO_2$, $MoO_3$ and $Fe_2O_3$.

A reversible reaction refers to a reaction in which ions in the electrolyte and the additives undergo redox reaction or intercalation.

Therefore, the additive is a material capable of performing a redox reaction or an intercalation reaction with ions of an electrolyte, and for example, $MnO_2$ is a material capable of performing a redox reaction and $LiMn_2O_4$ is a material capable of performing an intercalation reaction.

In addition, the amount of conductive material required to measure the specific surface area of the conductive material in the system to measure the specific surface area of the conductive material is 1 μg or more.

The additive is contained in an amount of 1 to 20 parts by weight, preferably 5 to 15 parts by weight, based on the total weight of the conductive material with the electric double layer.

If the additive is contained in an amount of less than 1 part by weight, the reactivity of the additive decreases, diffusion of the electrolyte deteriorates, and Warburg element may appear strongly. If the additive is contained in an amount exceeding 20 parts by weight, the amount of the additive is excessively high, which hinders the formation of a structure of a conductive material or the formation of an electric double layer, thereby making it difficult to measure the electric double layer capacitance of the conductive material.

The calculation of the specific surface area of the conductive material from the capacitance in the calculation module 16 of step (3) can be calculated by the following Equation 1 or 2:

$$C = \frac{\varepsilon A}{4\pi d} \quad \text{[Equation 1]}$$

wherein,
C: Capacitance of the electric double layer of the conductive material,
A: Specific surface area of the conductive material,
ε: Permittivity, and
d: Distance of the electric double layer of the conductive material, $$SSA = \frac{C}{C_0 m} \quad \text{[Equation 2]}$$

wherein
SSA: Specific surface area per mass of the conductive material,
C: Capacitance of the electric double layer of the conductive material,
$C_0$: Capacitance relative to the specific surface area of the reference conductive material under the same measurement conditions, and
m: Mass of the conductive material.

Therefore, the specific surface area of the conductive material can be calculated through Equation 1 or 2.

$C_0$ in equation 2 is a value measured as capacitance relative to the specific surface area of the conductive material under the same measurement conditions as the present invention, and serves as a reference.

The term "module" as used herein refers to a unit for handling a particular function or operation, which may be implemented by hardware, software, or a combination of hardware and software.

Hereinafter, the present invention will be described in detail with reference to examples to illustrate the present invention. However, the examples according to the present invention can be modified into various other forms, and the scope of the present invention should not be construed as being limited to the examples described below. The examples of the present invention are provided to enable those skilled in the art to more fully understand the present invention.

EXAMPLES

<Measurement of Specific Surface Area of Conductive Material>

Example 1

A sample was prepared by adding 10 μg of $LiMn_2O_4$ as an additive to 180 μg of carbon black, and a three-electrode electrochemical cell was constructed using the sample as a working electrode and then electrochemical impedance spectroscopy was performed on a potentiostat connected to a PC.

In the electrochemical cell, the reference electrode was a saturated calomel electrode (SCE) and the counter electrode was a Pt wire.

The electrochemical impedance spectroscopy was performed using 2M lithium nitrate (aqueous) as an electrolyte and was measured at a 1 V bias from 10 kHz to 0.1 Hz. In the Randle Circuit, another C, which indicates the pseudo-capacitance, was added to the end of the circuit (FIG. 1).

The capacitance of the electric double layer of the carbon black was measured to be 5.111e-5F from the electrochemical impedance spectroscopy. As a result of substituting the above capacitance into Equation 1, the specific surface area of carbon black, which is a conductive material, was calculated at 100.96 $m^2/g$ (FIG. 2).

Comparative Example 1

An impedance spectrum was obtained in the same manner as in Example 1, except that the additive was not used (FIG. 3).

In Comparative Example 1, since the additive was not used, the capacitance of the carbon black, which is a conductive material, was not measured at all and the specific surface area of the carbon black could not be obtained therefrom.

The invention claimed is:
1. A method to measure the specific surface area of a conductive material, comprising the steps of:
 (1) placing an additive, which forms a shunt resistance, onto the conductive material with an electric double layer;
 (2) measuring the capacitance of the electric double layer of the conductive material through electrochemical impedance spectroscopy (EIS) performed in an electrochemical cell comprising an electrolyte; and
 (3) calculating the specific surface area of the conductive material from the capacitance;

wherein the additive is a material that reversibly reacts with ions of the electrolyte.

2. The method to measure the specific surface area of the conductive material of claim 1, wherein the additive is a material that performs a redox reaction or an intercalation reaction with the ions of the electrolyte.

3. The method to measure the specific surface area of the conductive material of claim 1, wherein the conductive material is 1 µg in weight or more.

4. The method to measure the specific surface area of the conductive material of claim 1, wherein the additive is contained in an amount of 1 to 20 parts by weight based on the total weight of the conductive material.

5. The method to measure the specific surface area of the conductive material of claim 1, wherein the specific surface area of the conductive material is calculated from the capacitance by the following Equation 1 or 2:

$$C = \frac{\varepsilon A}{4\pi d} \quad \text{[Equation 1]}$$

wherein,
C: Capacitance of the electric double layer of the conductive material,
A: Specific surface area of the conductive material,
ε: Permittivity, and
d: Distance of the electric double layer of the conductive material, $$SSA = \frac{C}{C_0 m} \quad \text{[Equation 2]}$$

wherein
SSA: Specific surface area per mass of the conductive material,
C: Capacitance of the electric double layer of the conductive material,
$C_0$: Capacitance relative to the specific surface area of the reference conductive material under the same measurement conditions, and
m: Mass of the conductive material.

6. A system to measure the specific surface area of a conductive material comprising of:
(1) an addition module to place an additive, which forms a shunt resistance, onto the conductive material with an electric double layer;
(2) a measurement module to measure the capacitance of the electric double layer, of the conductive material through electrochemical impedance spectroscopy (EIS) performed in an electrochemical cell comprising an electrolyte; and
(3) a calculation module to calculate the specific surface area of the conductive material from the capacitance;
wherein the additive is a material that reversibly reacts with ions of the electrolyte.

7. The system to measure the specific surface area of the conductive material of claim 6, wherein the additive is a material that performs a redox reaction or an intercalation reaction with the ions of the electrolyte.

8. The system to measure the specific surface area of the conductive material of claim 6, wherein the conductive material is 1 µg in weight or more.

9. The system to measure the specific surface area of the conductive material of claim 6, wherein the additive is contained in an amount of 1 to 20 parts by weight based on the total weight of the conductive material.

10. The system to measure the specific surface area of the conductive material of claim 6, wherein the specific surface area of the conductive material is calculated from the capacitance in the calculation module by the following Equation 1 or 2:

$$C = \frac{\varepsilon A}{4\pi d} \quad \text{[Equation 1]}$$

wherein,
C: Capacitance of the electric double layer of the conductive material,
A: Specific surface area of the conductive material,
ε: Permittivity, and
d: Distance of the electric double layer of the conductive material, $$SSA = \frac{C}{C_0 m} \quad \text{[Equation 2]}$$

wherein
SSA: Specific surface area per mass of the conductive material,
C: Capacitance of the electric double layer of the conductive material,
$C_0$: Capacitance relative to the specific surface area of the reference conductive material under the same measurement conditions, and
m: Mass of the conductive material.

* * * * *